C. F. & E. G. DAVIS.
TRACTION AGRICULTURAL MACHINE.
APPLICATION FILED MAY 3, 1913.
1,179,902.
Patented Apr. 18, 1916.
6 SHEETS—SHEET 3.
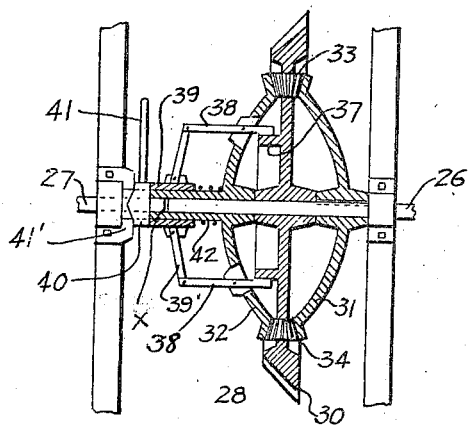
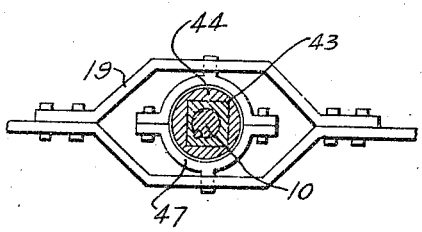
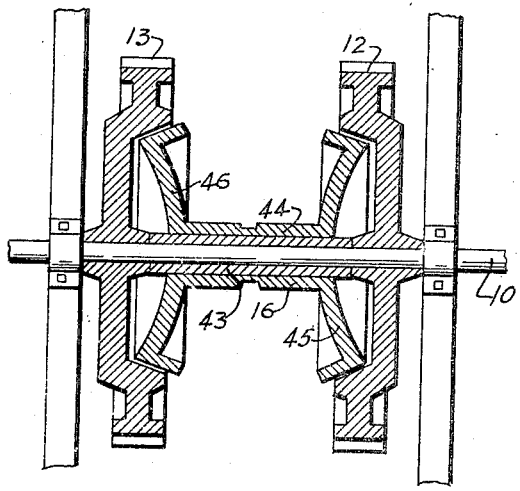
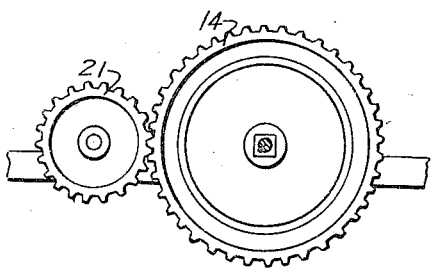
Witnesses
Robert M. Sutphen.
A. I. Hind.
Inventors
C. F. Davis and
E. G. Davis.
By Watson E. Coleman
Attorney

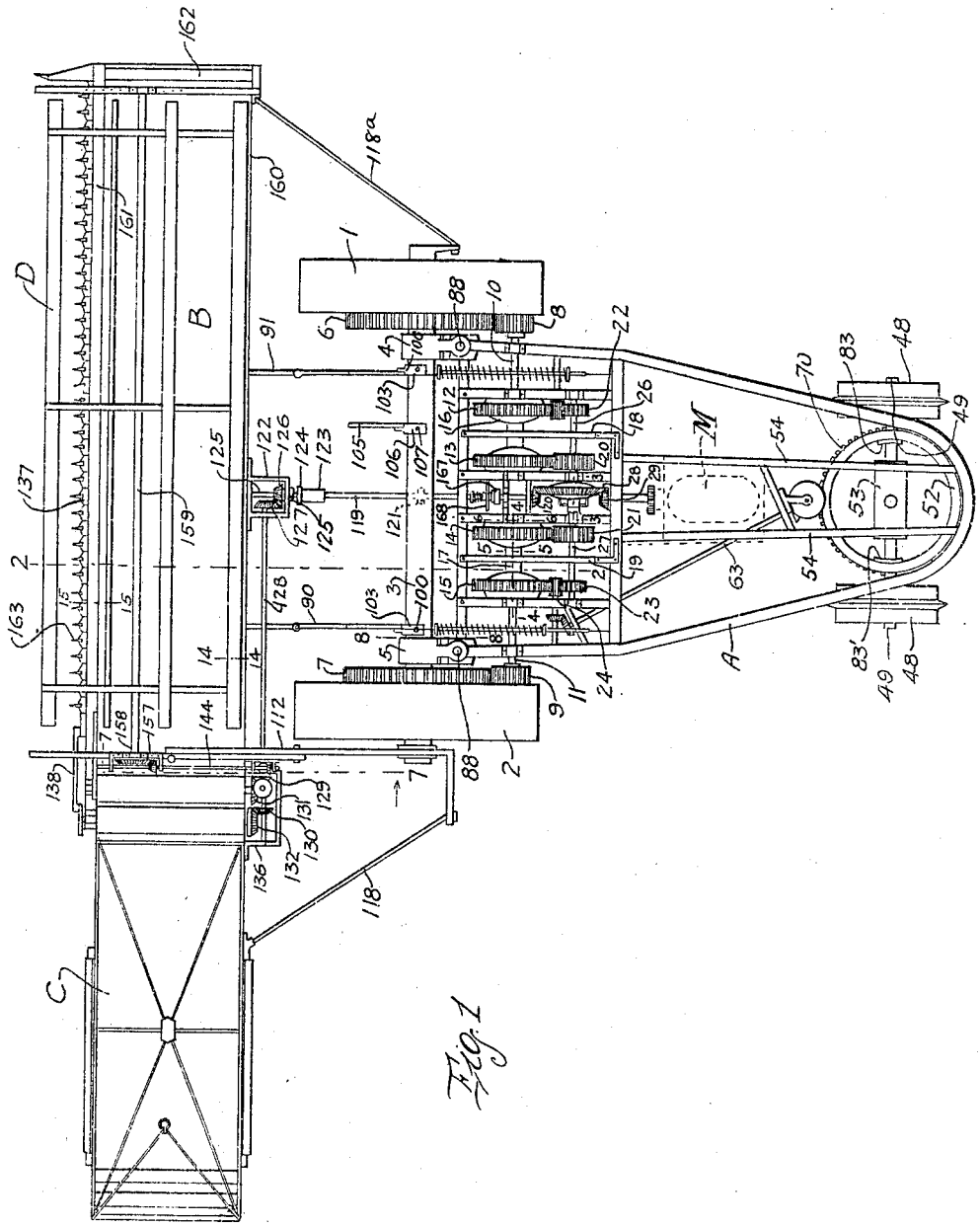

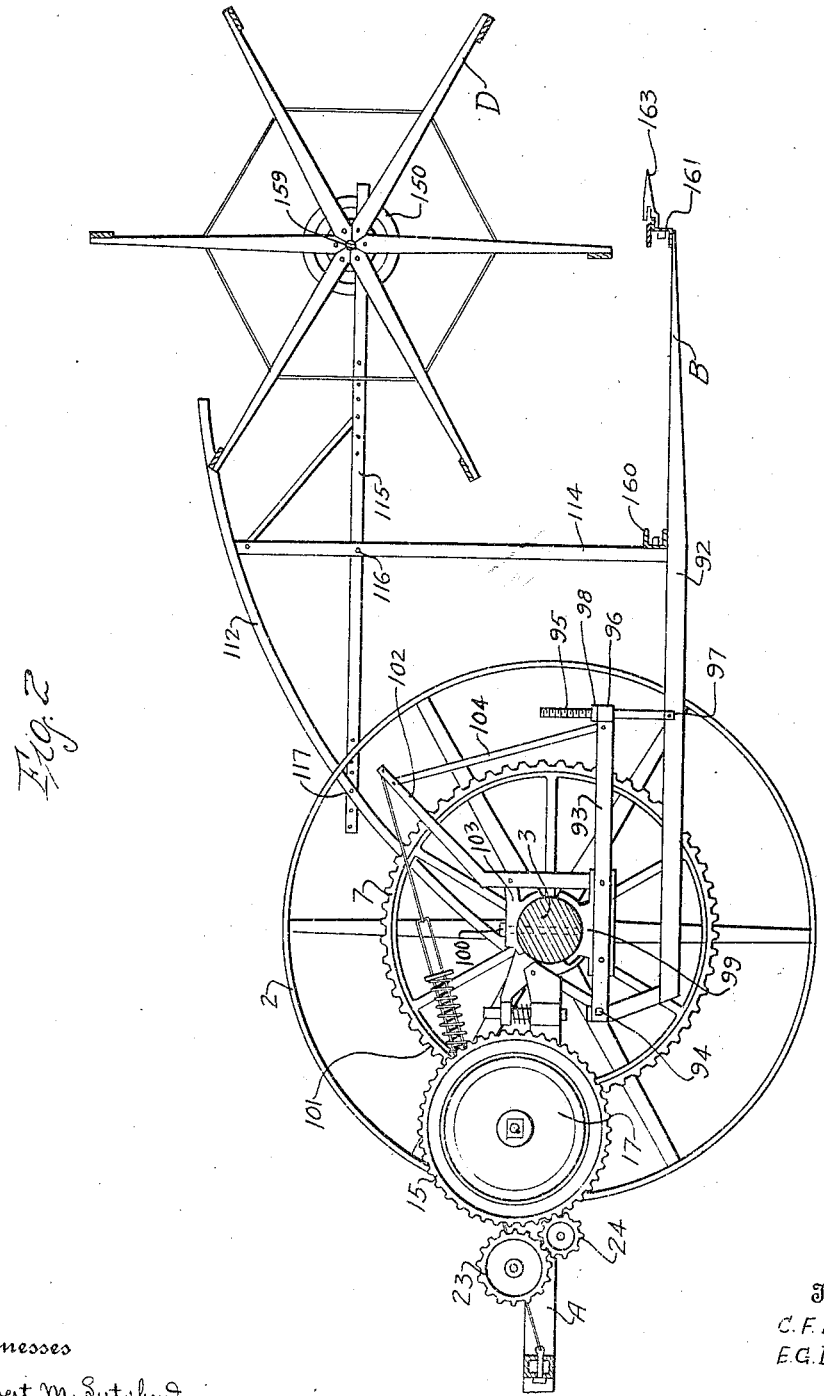

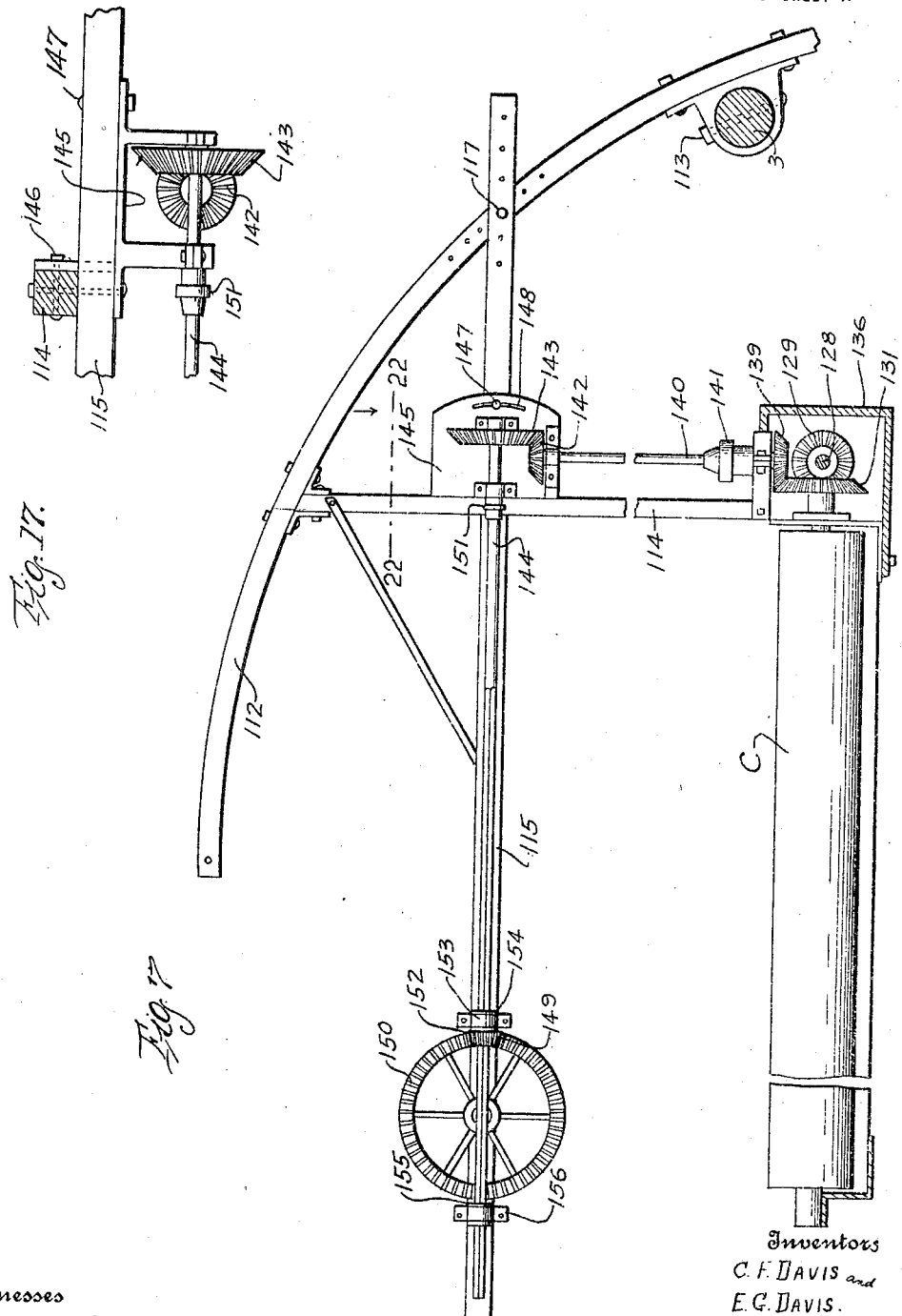

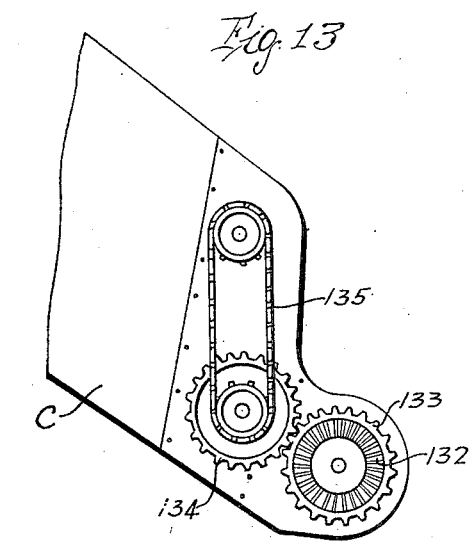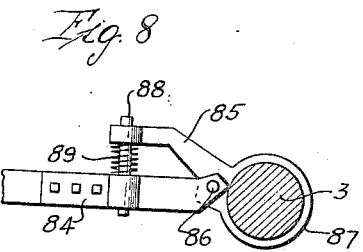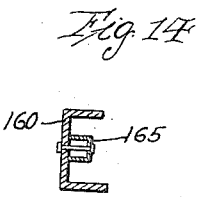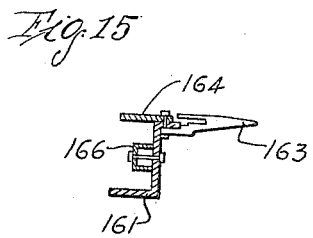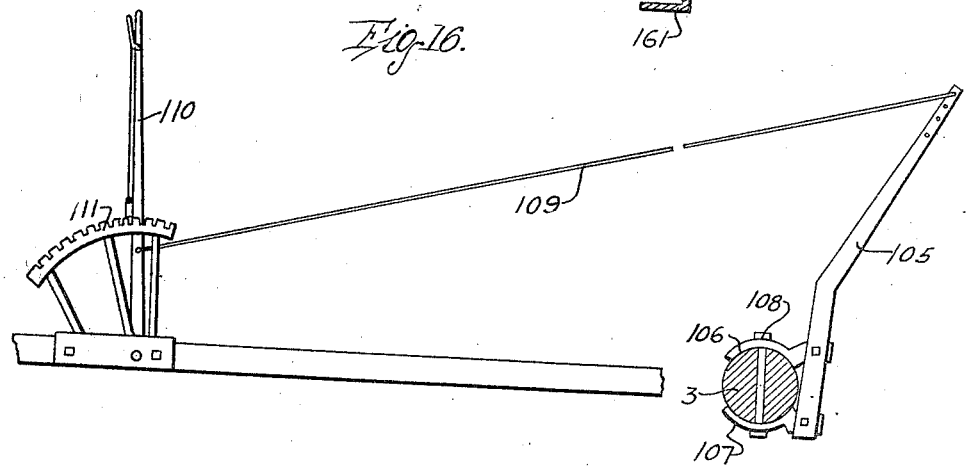

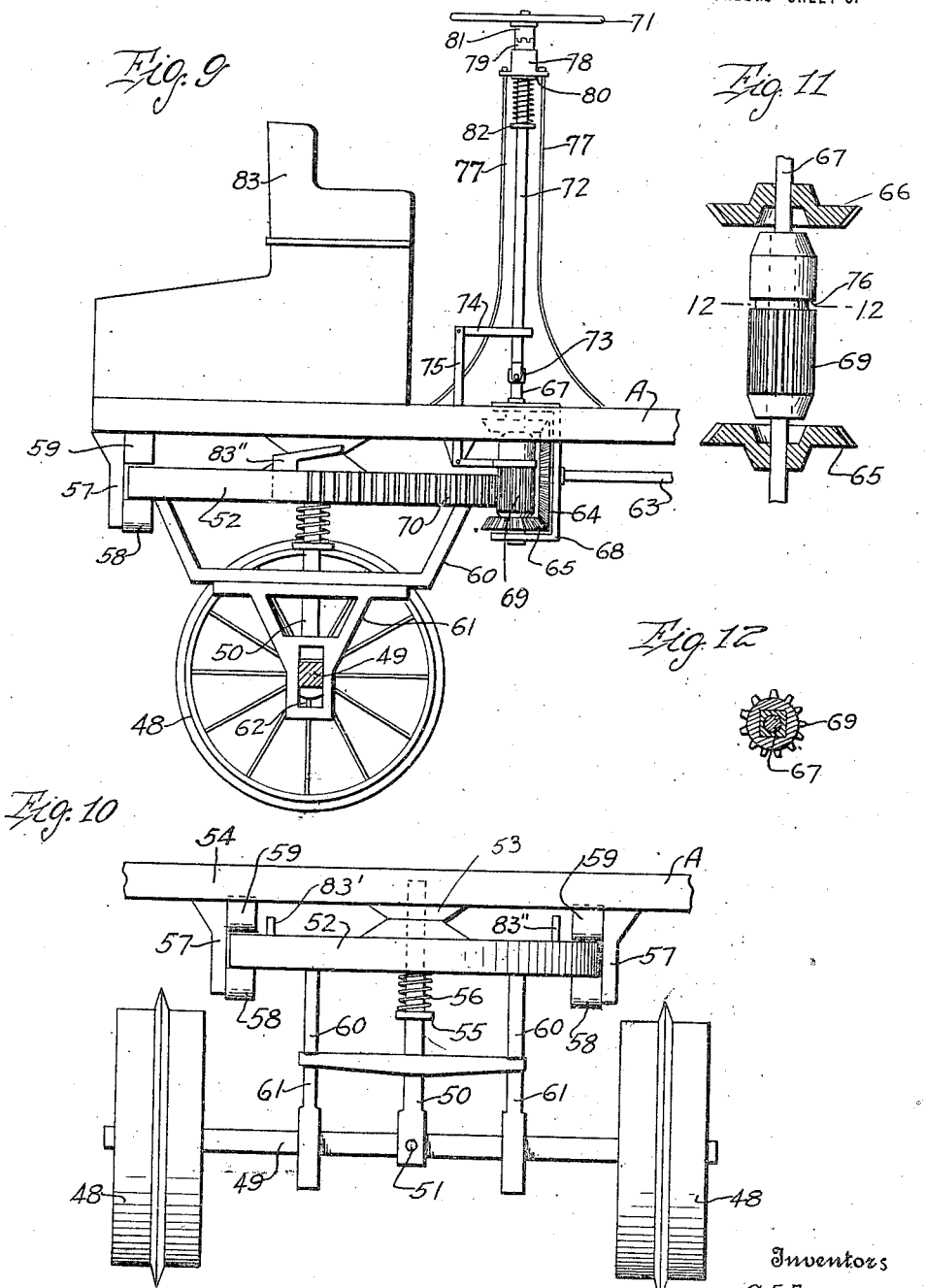

UNITED STATES PATENT OFFICE.

CHAUNCEY F. DAVIS AND EARL G. DAVIS, OF NEAR FAIRVIEW, OKLAHOMA.

TRACTION AGRICULTURAL MACHINE.

1,179,902. Specification of Letters Patent. Patented Apr. 18, 1916.

Application filed May 3, 1913. Serial No. 765,363.

*To all whom it may concern:*

Be it known that we, CHAUNCEY F. DAVIS and EARL G. DAVIS, citizens of the United States, residing near Fairview, in the county of Major and State of Oklahoma, have invented certain new and useful Improvements in Traction Agricultural Machines, of which the following is a specification, reference being had to the accompanying drawings.

This invention relates to traction vehicles and has for an object to provide a device of this character which will effectively operate under all conditions of service, and in which every part and its function will be so simple that inexperienced persons may readily understand and operate the machine.

A further object is to produce a traction vehicle which may be equipped with a header, or push binder, and will perform all turns that the ordinary horse power machine is called upon to perform *i. e.* will turn either to the right or left when going forward, may be reversed either on one or both drive wheels without stopping the motor, and will turn a square corner in either direction in minimum time.

A further object is to provide a machine of this character which when used as a header, will cut all the grain uniformly because of novel means which we have provided for maintaining the uniform and constant motion of the cutting knife and reel regardless of the direction in which the machine is traveling.

A further object is to provide a machine of this character having novel means for actuating the reel, the cutting knives, and the canvas apron from a single drive shaft, whereby the above named parts are constantly driven at a uniform speed and thus skipping of the grain is positively prevented.

With the above objects in view the invention consists of certain novel details of construction and combination of parts hereinafter fully described and claimed, it being understood that various modifications may be made in the minor details of construction within the scope of the appended claim.

In the accompanying drawings illustrating this invention:—Figure 1 is a plan view of the machine equipped with header mechanism. Fig. 2 is a longitudinal sectional view on the line 2—2 Fig. 1 with parts removed. Fig. 3 is a cross sectional view on the line 3—3 Fig. 1. Fig. 4 is a cross sectional view on the line 4—4 Fig. 1. Fig. 5 is a longitudinal sectional view on the line 5—5 Fig. 1. Fig. 6 is a longitudinal sectional view on the line 6—6 Fig. 1. Fig. 7 is a longitudinal sectional view on the line 7—7 Fig. 1. Fig. 8 is a longitudinal sectional view on the line 8—8 Fig. 1. Fig. 9 is a fragmentary side elevation showing the rear portion of the main frame and rear truck with the near ground wheel removed. Fig. 10 is a rear elevation of the parts shown in Fig. 9 with parts removed. Fig. 11 is a detail view showing the turn table clutch pinion. Fig. 12 is a cross sectional view on the line 12—12 Fig. 11. Fig. 13 is a detail view showing the elevator drive mechanism. Fig. 14 is a cross sectional view on the line 14—14 Fig. 1. Fig. 15 is a cross sectional view on the line 15—15 Fig. 1. Fig. 16 is a detail view showing the lever for raising and lowering the header platform. Fig. 17 is a cross sectional view on the line 22—22 Fig. 7.

Referring now to the drawings in which like characters of reference designate similar parts, 1 and 2 designate large drive wheels mounted upon an axle 3 so that each will turn on the axle independently of the other. Attached to this axle by suitable connections 4 and 5, which will be hereinafter more fully described, is a main frame A which extends around in rear from the connection 4 to the connection 5 and supports at the rear end the steering truck, a description of which latter will be deferred until later.

The drive wheels 1 and 2 are equipped respectively with cog rims 6 and 7. Meshing with these cog rims are drive pinions 8 and 9 that are carried upon and driven by respective transverse shafts 10 and 11. These shafts are driven respectively by clutch gears 12, 13, and 14, 15 which clutch gears constitute the reverse gear of the machine. Clutch gears 13 and 14 are driven in the same direction and are used to drive the machine forwardly, while clutch gears 12 and 15 run in an opposite direction and are used to reverse the machine. These gears are fitted with double cone clutches 16 and 17 respectively which may be shifted from one to the other by lever arms 18 and 19, all of which mechanism will be later described in detail.

The clutch gears are driven by pinions 20, 21, 22, and 23, attached to suitable shafts 26 and 27 which shafts are driven by a differential gear 28. The reverse motion of clutch gears 12 and 15 is obtained by the use of idle pinions 24 and 25 attached to suitable stub shafts as shown. As will be understood, in order to obtain the independent movement of the drive wheels and preserve the tractor functions thereof, the two shafts 26 and 27 are connected by and driven independently by the differential gear 28. This differential gear is substantially similar to the usual type of differential gear with the exception that it is reinforced or stiffened as will be presently described, in order that one or the other of the drive wheels may be reversed, or stopped altogether in making a turn.

In Fig. 3, which shows a detail sectional view of the differential gear, 30 designates the main or large bevel gear which is driven directly from the motor M by the pinion 29 shown in Fig. 1. On opposite sides of this gear are disposed cupped plate wheels 31 and 32 which oscillate on four pinions 33 and 34, in the usual manner, thus effecting the desired differential drive and equalizing the pull on both drive wheels. The entire differential gear rests on the above mentioned shafts 26 and 27 which confront each other as shown at $x$. The shaft 27 is keyed to a sleeve 39 (see Fig. 3) which in turn as will hereinafter appear is mounted for rotation with the cup wheel 32. The shaft 26 is keyed to cup wheel 31 and extends through the gear 30 and cup wheel 32 and projects loosely into the sleeve 39, thus allowing the usual free oscillation of the differential gear. But since, as above stated it is necessary at times to retard or stiffen the differential gear, we have designed a clutch device which may be thrown off or on at will. To attain this end a brake flange 37 is formed on one side of the gear 30. Levers 38 are pivotally mounted on and project through the cup wheel 32 and are terminally equipped with suitable brake shoes adapted to frictionally engage the brake flange. The sleeve 39 is equipped with radial arms 39' which are connected to the outer ends of the levers. The sleeve 39 furthermore abuts against a cam sleeve 40 which is equipped with an operating lever 41 and has a V cam face which bears within a V-notch in an abutment sleeve 41'. To throw on the clutch the lever 41 is actuated with a consequent rotation of the cam sleeve 40 whereby the outer ends of the levers will be thrown outwardly and brake shoes applied to the brake flange, thus retarding the action of the differential gear. When the lever is released the clutch is thrown off by means of a coil spring 42.

Fig. 4 shows an enlarged sectional view through one of the clutch gears. These main clutches are of the cone type and are arranged in pairs and operating in a manner which is believed to be self-evident. The main clutches 16 and 17 are identical in construction and therefore a detail description of but one, namely, of the clutch 16, will suffice for both. The gears 12 and 13 have their confronting faces recessed as shown. The shaft 10 is provided with a square neck 43 in the nature of a sleeve which is keyed to the shaft between the gears 12 and 13, as best shown in Fig. 5. On this square sleeve is slidably fitted the common hub 44 of the cones 45 and 46, the rims of which are machined to nicely fit in the respective recesses of the gears 12 and 13. A shifting collar 47 made in two parts for ready removal and repair, is revolubly fitted in a groove formed centrally and circumferentially on the hub 44, this sleeve being connected to the above described shifting lever 18. As will be understood without further description, a single shift of the lever 18 in either direction throws one of the cones into engagement with the related gear and throws the other cone out of engagement with its related gear, whereby the drive wheel 1 may be rotated forwardly or rearwardly as desired.

In Figs. 9 and 10 the rear truck and its mountings is shown. This truck is so constructed that it can be turned in either direction sufficiently to permit of the rear end of the machine swinging about on the front end of the machine as a pivot. To attain this end we employ a pair of ground wheels 48 of sufficiently small diameter to pass under the rear end of the frame A, these wheels being turnably mounted on spindles at the ends of an axle 49 which is square in cross section. The axle is centrally pivoted between the branches of a forked king pin 50 by means of a pivot pin 51 whereby the axle is capable of oscillating vertically on its pivot to permit of either ground wheel raising or dropping to conform to inequalities in the soil. This pin passes centrally through a turn table 52 and into a stationary bearing block 53 carried by rigid longitudinal bars 54 that form a portion of the main frame, and forms the pivot upon which the turn table rotates.

The weight of the turn table and rear end of the machine is borne by the axle, and to attain this end a collar 55 is formed on the king pin and forms an abutment for a cushion helical spring 56 upon which the turn table rests. The turn table is held against wabbling by means of brackets 57 which depend from the main frame and are equipped with lower rollers 58 which bear against the bottom face of the turn table, and are further equipped with upper rollers 59 which bear upon the top face of the turn table. To limit oscillating movement of the axle 49 bracket arms 60 depend from the bottom face of the turn table and carry hangers 61 which are provided with vertical oblong slots or guideways 62 which receive the square axle, contact of the latter with the ends of these slots serving to limit oscillatory movement of the axle.

Owing to the peculiar work the turn table is called upon to perform it is necessary that it be turned at times by power and at other times by hand. For example, when turning a square corner it is more expedient to turn it by power, and when traveling straightaway it is best to turn it by hand. The novel steering mechanism shown best in Fig. 9 makes this power and hand operation possible. The steering mechanism is driven by power through the instrumentality of a shaft 63 which has a gear connection with the shaft of the idle pinion 24, as shown in Fig. 1. The rear end of the shaft 63 is equipped with a bevel gear 64 which meshes with and turns idly in opposite directions clutch gears 65 and 66 through which a shaft 67 extends vertically, this shaft as well as the shaft 63 being journaled in suitable bearings carried by a bracket 68. On a square neck on the shaft 67 between the clutch gears 65 and 66 is mounted for vertical sliding movement a clutch pinion 69 which is formed with cone ends adapted to engage in corresponding recesses in the clutch gears as best shown in Fig. 11. The clutch pinion meshes with a cog rim 70 formed on the turn table. It will be apparent that when the clutch pinion is forced down into engagement with the clutch gear 65 it is turned by the latter and turns the turn table in one direction, and that when the clutch pinion is raised and engaged with the gear 66 it is turned by this gear and turns the turn table in the opposite direction. Or the clutch pinion may be held midway between and be "off" of either of the clutch gears allowing them to turn idle.

The above described shifting of the clutch pinion 69 is obtained by shoving forward or backward on a steering wheel 71 which is carried by a steering shaft 72 that is connected to the shaft 67 by a hinge 73, there being an arm 74 carried by the steering shaft above the hinge which arm is pivotally connected to one leg of a bell crank lever 75, the other leg of this lever being preferably forked and engaging in a circumferential groove 76 in the clutch pinion. Upon the steering wheel being shoved forward the bell crank lever will shift the clutch into engagement with the lower clutch gear 65, and upon the steering wheel being pulled rearwardly the bell crank lever will shift the clutch into engagement with the upper clutch gear 65. In the normal position of the hand wheel the steering shaft 72 extends vertically and the clutch is in neutral or "off" position whereby the power drive of the turn table is inactive and the turn table may now be turned manually. However, when the power drive is thrown "on" it is necessary that the hand wheel 71 be released so that it will not be turned in the hands of the operator. This is accomplished by means of spring rods 77 which are attached to the main frame and extend up along the shaft 72 and are loosely secured in front and rear perforated lugs carried by a sleeve 78. When the steering wheel is drawn back the forward rod will pull down the sleeve 78 and when the steering wheel is pushed forward the rear rod will pull down the sleeve 78. When the sleeve is pulled down, it also pulls down an inner sleeve 79 which loosely fits the steering shaft 72 and has an abutment collar 80 at the bottom upon which the outer sleeve 78 is supported. The inner sleeve is provided in the top with serrations which normally engage with corresponding serrations in the hub 81 of the steering wheel. The inner sleeve is normally held up and engaged with the steering wheel by means of a helical spring seated on the steering shaft and bearing against an abutment collar 82 thereon. Now when the inner sleeve 79 is pulled down, it releases the steering wheel 71 which is then free to turn on the steering shaft 72. This allows the steering shaft to turn while the hand wheel is held stationary by the operator. It will be understood that the steering shaft and above described connections therefor may be housed in a casing if desired without sacrificing any of the advantages of the invention. This casing may be fitted with the usual engine controls for the motor (not shown). Near the steering wheel is arranged a driver's seat 83, which may be fitted as desired with gasolene tank, tool box or such other attachments as would seem best.

On the inner face of the turn table rim are disposed opposite cams 83′ and 83″ for the purpose of automatically preventing too great swinging of the truck by throwing off the clutch when the truck wheels have swung through an arc of ninety degrees in either direction. When the cam 83′, which has a sloping cam surface, comes around to the lever 75, it forces the lever up and releases the clutch. Likewise, when the cam 83″ comes around to the lever 75, it forces the lever down and releases the clutch. These cams however do not prevent the truck from being swung back by reversing the clutch. The means 4 and 5 for attaching the front ends of the main frame bar A to the axle 3, each comprise two bars 84, see Fig. 8, which are attached to either side of the frame bar and are hinged to an angular casting 85 by means of a pivot pin 86, the casting having an integral ring bearing 87 which loosely surrounds the axle and allows of the axle turning therein when the platform hereinafter described is being shifted. The casting has an opening formed in rear of the pivot pin in which opening a vertically disposed pin 88 loosely projects, the pin being rigidly secured at the base in any preferred manner to the bars 84. A cushion spring 89 is seated on the pin between the casting and bars 84 and absorbs all shocks and jars during rocking of the main frame on the pivot 86 upon passage of the machine over uneven ground.

The platform B, elevator C and reel D of the header attachment will now be described, and during such description reference will be made more especially to Figs. 1, 2 and 7 wherein the parts are best illustrated.

The platform B is attached to the axle 3 by means of a pair of supports 90 and 91, both identical in construction, and the construction of one of which may be best seen by reference to Fig. 2, said supports being positioned between the wheels 1 and 2. Each support comprises a substantially horizontal bar 92 which is swung from the axle 3 by means of an upper horizontal bar 93, the lower bar 92 being curved upwardly at the rear end and there hinged to the rear end of the upper bar 93 by means of a pivot pin 94. An adjusting pin 95 is passed loosely through a suitable eye 96 on the forward end of the upper bar and is pivotally connected at the lower end to the lower bar by means of a pivot pin 97, there being an adjusting nut 98 threaded on to the pin above the eye 96 by means of which the platform may be raised or lowered to accommodate the machine to different heights of grain. The bar 93 is attached to the axle by means of a casting 99 that is attached to the lower side of the axle by means of a bolt 100. The weight of the platform is carried by a large coil spring 101 that is attached at the rear end to the main frame and at the forward end to an arm 102 that is attached to the axle by means of a casting 103 which casting is secured by the same bolt 100 as the casting 99, both these castings being disposed directly opposite each other. The arm 102 is attached to the upper bar 93 by means of a brace 104 so that the weight may be carried with no undue strain on the castings and axle. The platform B is further supported by the arm 118ª secured to an outer end of the axle 3 and the adjacent end portion of the platform B, as is thought to be particularly shown in Fig. 1.

A means for tilting the platform is shown in Fig. 21, in which 105 designates a lever which is rigidly secured to the axle 3 by means of opposite castings 106 and 107 that are anchored in position by means of a common bolt 108. A link 109 connects this lever with an operating lever 110 that is equipped with the usual rack and pawl 111 for locking the lever in adjusted position. As will be apparent, manipulation of the operating lever serves to rock the axle and thus raise or lower the platform and parts carried thereby to accommodate the machine to different heights of grain.

The elevator C and reel D are also supported by the axle 3 as best shown in Figs. 1, 2 and 7. To attain this end a bar or arm 112 is attached near the lower end to an extremity of the axle 3 by means of a bolt 113 and extends up in the arc of an ellipse over and is fixed to the top of an upright brace 114 which is attached at the lower end to the elevator C, the bar 112 thus serving to support and carry the weight of the elevator. The bar 112 also serves as an adjustable support for the reel D the latter being carried at the inner end on a horizontal bar 115 which is pivotally attached to the brace 114 by means of a pivot bolt 116 and is adjustably secured at the rear end to the bar 112 by means of a pin 117 selectively passed through an opening of a series of openings in the said bar 112. The bar 112 extends downwardly in rear of the axle 3 to a point in alinement with the hinge connection between the elevator and platform where it is connected to an inclined brace or arm 118, see Fig. 1, that is attached to the elevator C and affords an additional support for the elevator C.

From the above description it will be apparent that the platform B, elevator C, and reel D, are all fixed to the axle 3 and the weight of all the parts supported by the two large coil springs 101 connected to the main frame in rear of the axle, and further that upon rocking of the axle through the instrumentality of the operating lever 110, the above named members of the header will be raised or lowered to accommodate the machine to various heights of grain.

The operation of the cutter will now be described. The cutter is driven by a direct drive from the differential gear whereby the cutter is continuously actuated regardless of the direction in which the machine is moving, and thus skipping of the grain is prevented. The driving shaft 119 extends from the differential gear where is is equipped with a pinion 120 driven by the latter, forwardly under and below the axle where it is jointed and fitted with a knuckle 121.

From the knuckle it extends to the transmission gear at the rear of the platform B where it is attached by means of a suitable bearing 122 to the platform. The driving shaft is squared at the forward end and fits in a cast sleeve 123 which has a knuckle 124 to allow for any change of angle caused by raising or lowering of the platform. This knuckle is attached to a stub shaft 125 to which is attached a pinion 126. The pinion 126 drives a pinion 127 attached to a shaft 128 which extends along the rear edge of the platform to the extreme left end of the latter where gearing is attached by means of which the rollers of the elevator, and the reel are driven.

To the shaft 128 are attached small bevel pinions 129 and 130 which drive bevel gears 131 and 132 attached to the ends of respective roller shafts of the elevator. The gear 132 is formed with an integral spur gear 133 for driving the upper roller of the elevator, as best shown in Fig. 13. The gear 133 drives an idler 134 to which is attached a sprocket chain 135 that drives the upper roller of the elevator. The above described gearing is inclosed in a suitable casing 136 which is rigidly fastened to the back of the platform. The sickle bar 137 is driven by means of a pitman 138 from one of the elevator rollers as shown.

In Fig. 7 is shown the elevator roller and reel driving mechanism. The reel as shown is driven from the driving gear 131 of one of the elevator rollers. The gear 131 drives a pinion 139 carried by a stand shaft 140 which is equipped with a knuckle 141 to allow for any change of direction which it may be necessary to give the upper end of the shaft. The shaft is fitted with a pinion 142 which drives a gear 143 that drives the reel. This gear 143 with its supports is best shown in Fig. 22 wherein it will be seen that the gear is mounted on a stub shaft 144 which is supported by a plate casting 145 that is secured as shown at 146 to the above mentioned upright brace 114 and also secured to the reel supporting rod 115 by a bolt 147 working in a slot 148, to allow for shifting of the reel.

From the gear 143 the shaft 144 extends forward along the reel supporting rod 115 and is equipped near the end with a pinion 149 which drives a gear 150 on the end of the reel shaft. The shaft 144 is broken at its passage across the reel supporting rod 114 and there fitted with a knuckle 151 so that in shifting the reel up or down the shaft will always be in line. The outer or forward end of the shaft 144 is squared and passes through the pinion 149 that drives the reel. The pinion 149 has an extension or hub 152 which passes through a boxing 153 and is shouldered at the end as shown at 154. Likewise, there is a sleeve 155 on the shaft 144 that is disposed in a boxing 156 and is shouldered up at either end as shown. These sleeves having square bores may be slipped along the shaft 144 to allow for shifting of the reel. The boxings 153 and 156 are integral with a casting 157 that is adjustably secured to the reel supporting arm 115, as best shown in Fig. 1, this casting also carrying a bearing 158 for the reel shaft 159.

In constructing the platform, the back rib 160 is formed of channel iron as best shown in Fig. 14, while the front rib 161 is formed of Z bar as best shown in Fig. 15. The boxing for the outer roller 162 of the canvas apron of the platform is carried by the front rib as shown in Fig. 1. The sickle bar guards 163 are attached to the front rib as is also the guard strip 164 which holds the canvas down. The sickle (not shown) reciprocates upon this plate through the guard in the usual manner. Disposed on the inner faces of the front and rear ribs of the platform are U-bolts 165 and 166 which separate the upper lap from the lower lap of the canvas apron (not shown).

Since it is necessary that the header mechanism be thrown out of gear while transporting the machine from place to place under its own power, a cone clutch 167 is operatively connected to the header driving shaft 119 and is controlled by shift lever 168.

The general shape and construction of the main frame of the machine is clearly shown in Fig. 1 and a detailed description thereof will not be given. The motor is placed at about the center of the frame at the place indicated and is operatively connected in any suitable manner to the differential gear 28.

What is claimed, is:—

A machine of the character described comprising, in combination, a wheel supported axle, castings disposed rearwardly relative to the axle and provided with annular members through which said axle is loosely directed, a frame having side bars pivotally engaged with the castings in close proximity to the annular members, the rear portion of each of the castings being provided with a vertically disposed opening, a pin carried by each of the side bars and loosely disposed through the opening of the casting, a cushioning spring surrounding the pin and interposed between the casting and the bar, a forwardly directed bar secured to the under surface of the axle and extending beyond opposite sides thereof, an upstanding arm supported by the axle in advance thereof, a coil spring operatively engaged with the upper extremity of the arm and the frame at a point rearwardly of the axle, a brace interposed between the upper extremity of the arm and the forward extremity of the bar, a platform pivotally engaged with the rear extremity of the bar, a member pivotally engaged with the platform and adjustably engaged with the bar for regulating the vertical position of the platform, and a header mechanism carried by the platform.

In testimony whereof we hereunto affix our signatures in the presence of two witnesses.

CHAUNCEY F. DAVIS.
EARL G. DAVIS.

Witnesses:
J. R. DAVIS,
H. A. DAVIS.